United States Patent
Matthews, Jr.

[15] 3,698,199
[45] Oct. 17, 1972

[54] METHOD AND APPARATUS FOR INSTALLATION OF A FLOW LINE RISER ON AN OFFSHORE STRUCTURE

[72] Inventor: Jamie F. Matthews, Jr., Houston, Tex.

[73] Assignee: Esso Production Research Company

[22] Filed: March 22, 1971

[21] Appl. No.: 126,965

Related U.S. Application Data

[63] Continuation of Ser. No. 802,458, Feb. 26, 1969, abandoned.

[52] U.S. Cl. ...................... 61/72.3, 61/46, 166/.6
[51] Int. Cl. ..................... E16l 1/00, E21b 43/01
[58] Field of Search ............ 61/72.3, 72.1, 46, 46.5; 106/0.5, .6

[56] References Cited

UNITED STATES PATENTS

| | | |
|---|---|---|
| 3,258,928 | 7/1966 | Broadway et al. ..........61/72.3 |
| 3,373,570 | 3/1968 | Hindman ....................61/72.3 |
| 3,431,739 | 3/1969 | Richardson et al. .........61/72.3 |
| 3,466,882 | 9/1969 | Broussard et al. ..........61/72.3 |

Primary Examiner—Jacob Shapiro
Attorney—Melvin F. Fincke, Thomas B. McCullock, John S. Schneider, Sylvester W. Brock, Jr. and Timothy L. Burgess

[57] ABSTRACT

A flow line riser is installed on an offshore structure by laying a pipeline to a point on water bottom adjacent the structure and raising the offshore structure to water surface where lengths of pipe are attached perpendicularly to the pipeline to form a riser, the pipeline and riser being lowered to water bottom as the lengths of pipe are attached while longitudinally maintaining substantially constant tension on said pipeline. When the pipeline and connected riser reaches water bottom, it is then attached to the structure.

22 Claims, 9 Drawing Figures

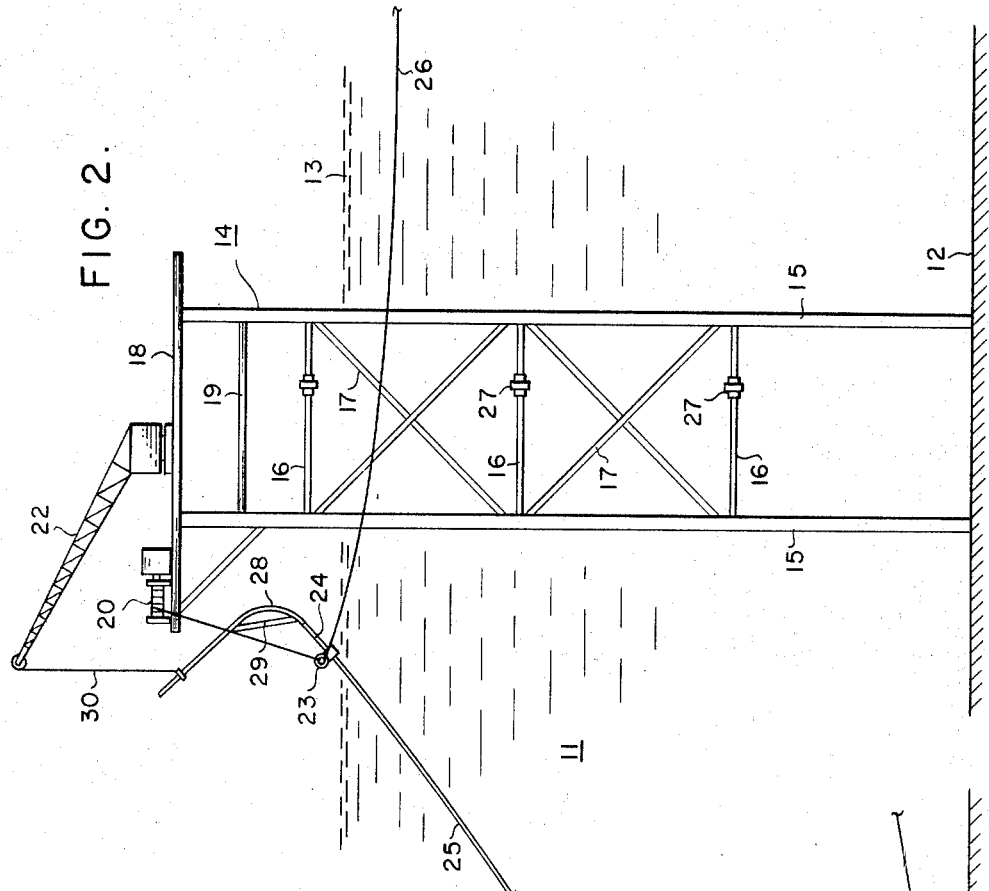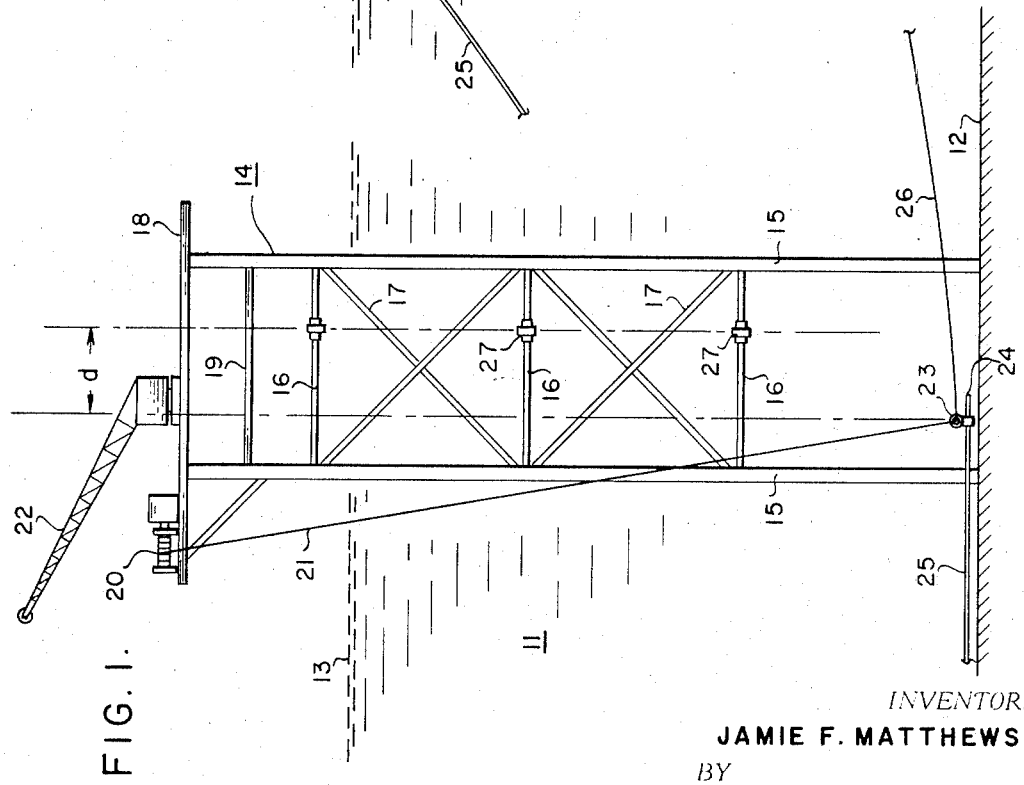

PATENTED OCT 17 1972 3,698,199
SHEET 2 OF 3
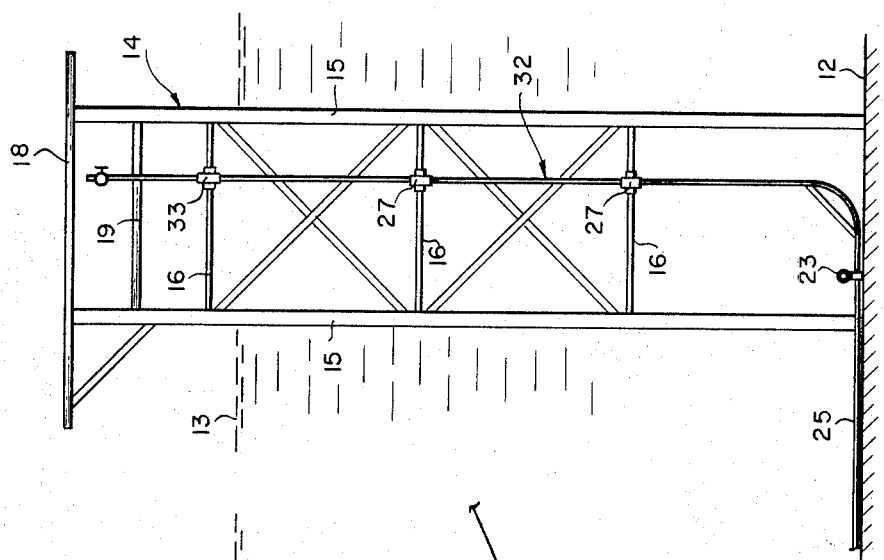
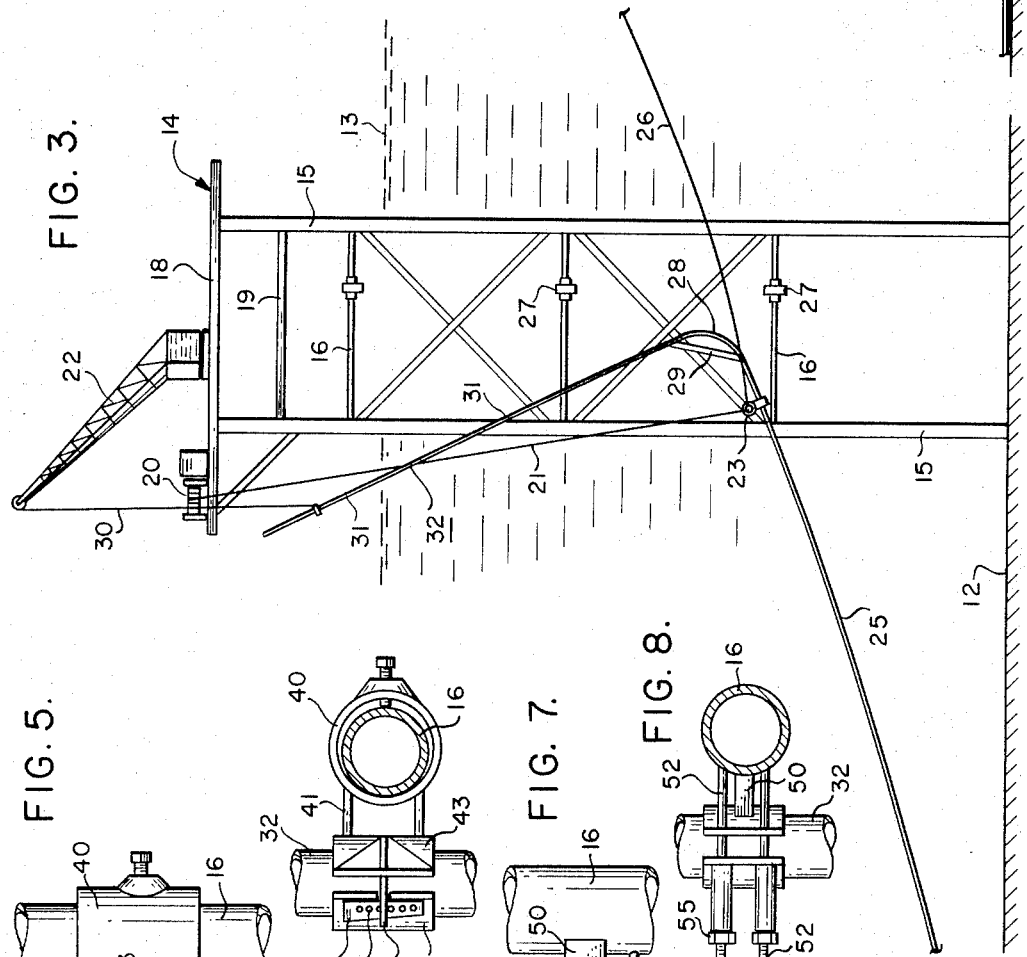
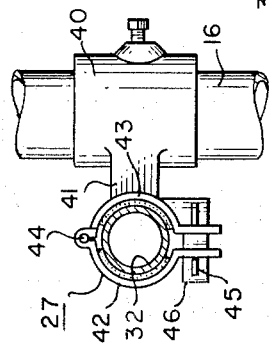
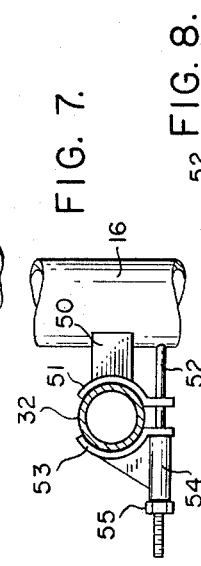
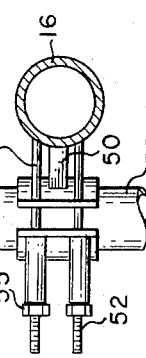
INVENTOR.
JAMIE F. MATTHEWS, JR.,
BY
ATTORNEY.

METHOD AND APPARATUS FOR INSTALLATION OF A FLOW LINE RISER ON AN OFFSHORE STRUCTURE

This application is a continuation of application Ser. No. 802,458 filed Feb. 26, 1969 and now abandoned.

BACKGROUND OF THE INVENTION

1. Field of the Invention

The present invention is directed to method and apparatus for installing a flow line riser on an offshore structure. More particularly, the invention is concerned with the installation of a flow line riser on an offshore structure in deep water. More particularly, the invention is concerned with installing a flow line riser on an offshore structure under controlled conditions.

2. Description of the Prior Art

It is known to connect flow line risers to pipelines by lowering the pipeline and riser to water bottom such that the ends of the riser and pipeline may be connected. It is also known to bring or lay a pipeline to an offshore structure, make up a flow line from water surface and connect the latter to the offshore structure, after pivoting same from a horizontal to vertical position, following which the riser and pipeline are connected. It is also known to lower a flow line riser on a guide rail with the lower end connected to a pipeline. However, all these methods and apparatus therefor require guide means and special equipment which the present invention dispenses with by employing a combination of hoisting equipment and pipe laying means in a particular way and arrangement. Specific prior art considered relative to this invention include the following U.S. Pat. No. 3,373,570 U.S. Pat. No. 3,376,708 U.S. Pat. No. 3,226,728 and U.S. Pat. No. 3,258,928.

SUMMARY OF THE INVENTION

The present invention may be briefly described and summarized as involving a method and apparatus for connecting a flow line riser to an offshore structure and to a pipeline in which the free end of the pipeline is raised to an accessible position (which may be water surface) and sections of pipe are joined to it substantially perpendicular thereto to form a flow line riser while maintaining longitudinal tension on the pipeline as the flow line riser is increased in length and lowered to water bottom until it extends from water bottom to the upper end of the offshore structure which may support a platform either above or below water surface, depending on the water depth; the pipeline and flow line riser being moved vertically and tension maintained by flexible means such as wire lines, cables, and the like, and winches or hoisting machinery.

The amount of tension will be that force required to maintain a radius of curvature in the pipeline which is of sufficient magnitude to produce a bending stress in the pipeline which is equal to or less than the allowable stress of the pipe.

BRIEF DESCRIPTION OF THE DRAWING

The present invention will be further illustrated by reference to the drawing in which:

FIG. 1 is a view of the present invention with the pipeline laid or pulled to the structure at a selected point short of point at which it will be joined to riser;

FIG. 2 illustrates the present invention with the pipeline raised to water surface and the beginning of the attachment of the riser;

FIG. 3 illustrates the placement of the riser and the lowering of the riser and pipeline to water bottom;

FIG. 4 illustrates the structure with the riser clamped into place;

FIG. 5 is a top view of the flow line riser clamp, showing the riser in cross-section;

FIG. 6 is an elevational view of the setting of the clamp of FIG. 5, showing the platform horizontal member in cross-section;

FIG. 7 is a clamp which may be operated without a diver;

FIG. 8 is an elevational view of the clamp in FIG. 7; and

DESCRIPTION OF THE PREFERRED EMBODIMENT WITH REFERENCE TO THE DRAWING

Figure 9:
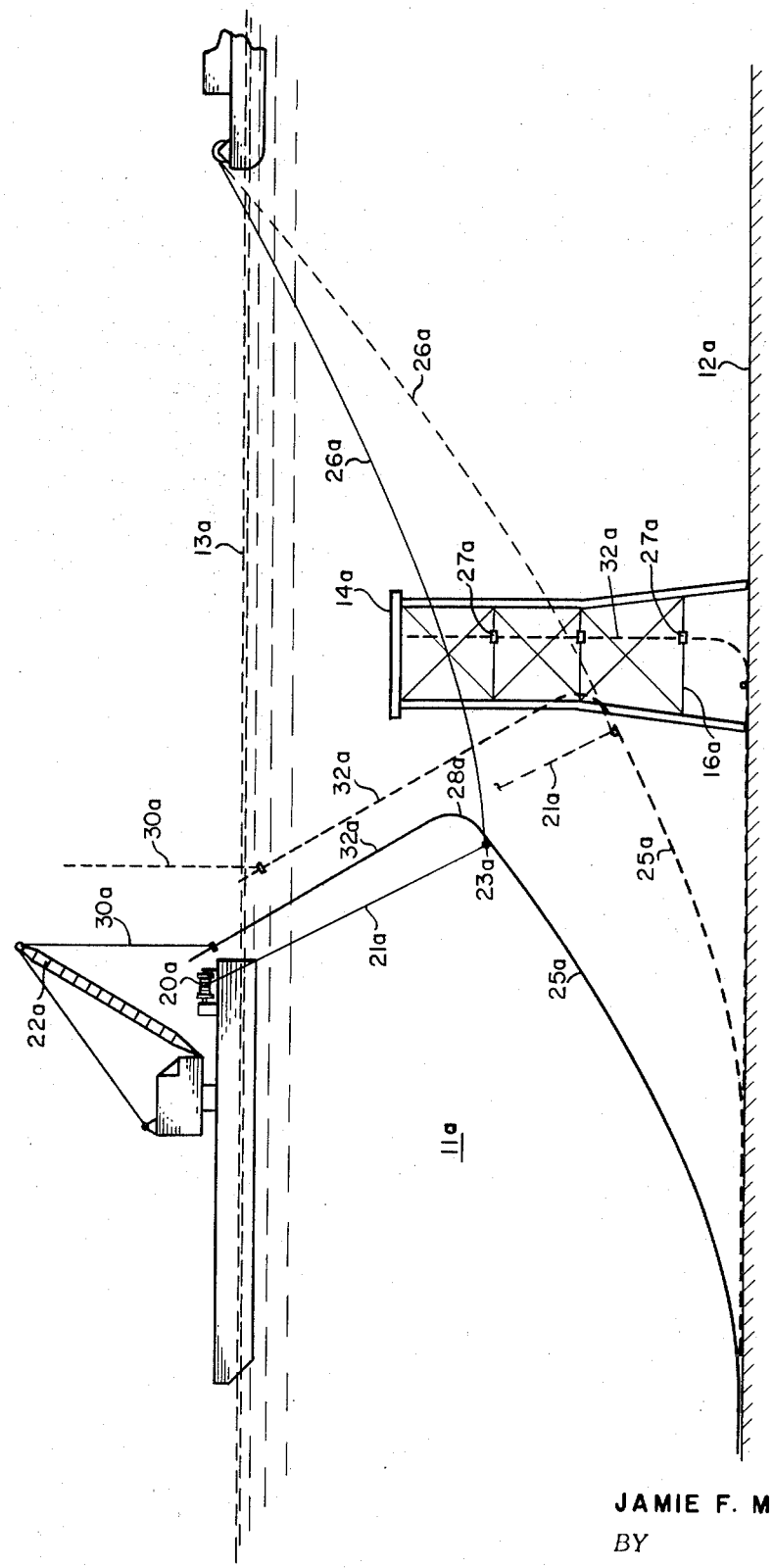
FIG. 9 illustrates a modification of the invention in which the platform is submerged.

Referring now to the drawing in which identical numerals will designate identical parts, in FIG. 1, numeral 11 designates a body of water having a bottom 12 and a water surface 13. The body of water 11 may have any depth, say from 50 to 1,500 or more feet. Arranged in the body of water 11 is an offshore structure 14 supported by members 15 embedded in water bottom 12 and strengthened by cross members 16 and 17.

The structure 14 is provided with a top deck or platform 18 and production deck or platform 19. Arranged on the top deck is a winch 20 on which a flexible member, such as a wire line, cable, or chain 21 may be reeled or spooled. The winch 20 is suitably operated by a power means not shown. Also arranged on the deck or platform 18 is a crane 22 which is also operated by a suitable power means not shown. Two means of hoisting are required; one to raise the pipeline to surface, the other to add joints of riser pipe as the line is lowered. The flexible member or line 21 is connected by a pulling clamp 23 to the free end 24 of pipeline 25 which suitably may extend to a terminal on another platform or on shore. The free end of pipeline 25 is also connected by pulling clamp 23 to a lay down or pull line 26 which extends to a barge floating on the water surface 13 not shown. The location of the end of the pipeline should be somewhere short of the point at which the 90° riser bend will be welded on. Thus, it will only be necessary to weld on the required length of pipeline before joining the 90° bend. If the pipe on bottom is too long, the pulling clamp would have to be cut off and relocated, a time-consuming operation.

The barge which is located a substantial horizontal distance (500'+−minimum-the deeper the water, the greater the distance) from the platform has (1) either pulled the pipeline to the position shown in FIG. 1 with cable 26, or (2) has laid the line by the "stovepipe" method or by the spool barge method and has lowered the pipeline to bottom by holding tension on cable 26. When the latter procedure is used, the cable is called the "lay down" cable. At this stage cable 21 has one end supported at the water surface by a buoy and has enough slack to permit the buoyed end to be raised to the platform deck without picking the pipeline off bottom. The buoy is picked up by the crane and cable 21 is plumbed vertically with enough tension to eliminate slack. A measurement between cable 21 and the centerline of the clamps is then taken. This measurement is designated $d$ on FIG. 1. From this measurement the length of pipe to be added to the free end 24 in addition to the 90° bend can be determined. Thus, cable 21 performs two functions: (1) when plumbed, the location of free end 24 relative to the riser clamps can be determined; and (2) after this step is taken, cable 21 is secured to winch 20 and will be used for raising and lowering the pipeline 25.

It is to be noted that the lower cross members 16 are provided with clamps 27 which are movable on cross member 16 and which are installed on platform 14 during land fabrication.

In FIG. 2, the pipeline 25 has been raised with the free end 24 adjacent the water surface 13, the required length of pipe has been joined to the end 24 and a flow line riser bend 28 which is suitably braced by bracing 29 has been connected thereto; the riser bend 28 being held by a flexible member or line 30 on crane 22 and connected to the riser bend 28. The required length of pipe has been installed between the free end 24 and the bend 28 to make the riser coincide with the centerline of the clamps 27 when pipeline is on bottom. The lay down line or pull line 26 attached to clamp 23 extends to the lay barge which is holding a substantially constant tension on the pipeline 25 horizontally or longitudinally. If water depth is too great, a second barge or vessel will have to be used as a supporting means since the end of the line 24 will be too far from the platform after the pipeline is raised to the surface. In this event, the crane 22 and winch 20 will be mounted on said second barge and not on the platform. As the pipeline 25 and the riser bend 28 are lowered from the water surface 13 as shown more clearly in FIG. 3, additional lengths of pipe 31 are added sufficient to allow the flow line riser which is being formed by adding lengths of pipe 31 will extend from water bottom 12 at least to the platforms 18 or 19 as the case may be. It is to be noted that tension is being held on the pipeline 25 by the lay down or pull line 26 as the pipeline 25 and the flow line riser 32 are being lowered; the lines 21 and 30 being powered from the winch 20 and the crane 22. The tension applied to the pipeline 25 through cable 26 should be constant throughout the riser setting operation. The amount of tension required will be different for each installation and will be a function of (among other things) water depth, specific gravity of pipe, physical properties of pipe (diameter, wall thickness, grade of steel, etc.), and allowable stresses. It is desirable that horizontal movement of the barge holding tension not be transmitted to the pulling clamp 23. This is especially critical while the 90° bend is being joined to the line. This movement can be reduced by using as long a tension cable 26 as possible. The stretch in the cable will partially absorb the movement. The use on the barge of a winch with hydraulic torque converter (sometimes called a "constant tension" winch) will practically eliminate movement and is preferred.

Referring to FIG. 4, it will be seen that the riser 32 has been completely formed with its upper end on the platform 19 ready for connection to a well not shown and/or to storage facilities also not shown; the pipeline 25 being now on water bottom and a conventional clamp 33 on the upper cross member 16 being welded to the upper cross member 16. The clamps 27, however, are designed to slide horizontally along the lower cross members 16 and also are designed to lock in place such as with a single set screw. These clamps may be positioned horizontally and are hinged for quick latching as will be shown in further detail. Thus, as illustrated in FIG. 4, the installation of the riser has been completed and placed on clamps and latched by a diver or remote manipulator as will be described; the cables 21 and 26 have been remotely released from pulling clamp 23, and tension has been removed. If a remotely operated riser clamp is used, the clamping may also be done remotely from the platforms 18 or 19, the operation being controlled by TV and/or by or from an atmospheric diving bell.

In the modification of the invention illustrated in FIG. 9, the platform is submerged and another second barge or vessel is used as a supporting means. All of the elements are otherwise the same and have been designated with the same numerals used to designate the various parts plus the letter $a$. The dotted lines indicate various positions of the pipeline 25a and riser 32a and laydown line or pull line 26a as the pipeline 25a and connected riser 32a are lowered into position for connection to structure 14a. Thus, the pipeline 25a has been raised with the free end adjacent the water surface 13a. The required length of pipe has been joined to the free end and a flow line riser bend 28a has been connected thereto. The riser bend 28a is held by a flexible member or line 20a on crane 22a. The required length of pipe has been installed between the free end and the bend 28a to make the riser coincide with the center line of the clamps 27a when the pipeline is on bottom. The laydown line or pull line 26a attached to clamp 23a extends to the lay barge which is holding a substantially constant tension on the pipeline 25a horizontally or longitudinally. As the pipeline 25a and the pipe 32a are lowered from the water surface 13a additional lengths of pipe are added sufficient to allow the flow line riser which is being formed to extend from water bottom 12a to a point near the deck of platform 14a. In some cases, vertical support for the pipeline provided by line 21a (or 21) can be dispensed with, particularly when handling large diameter pipelines in shallow water. In such cases, the vertical support provided by line 30a (or 30) will be adequate to permit handling of the pipe. In other instances, however, both lines will be required to prevent excessive bending stresses near the riser bend.

Referring now to FIGS. 5 and 6, such a clamp will now be described. The horizontal platform, members 16 have a slidable sleeve or collar 40 arranged thereon which is connected to the clamp 27 by a structural member 41. Thus, the clamp 27 is formed in two pieces 42 and 43 which are hingedly connected by hinge 44. The hinged portions 42 and 43 are closed by a member including a driving wedge 45 which is inserted in member 46 as shown in FIGS. 5 and 6. Locking pins may be suitably inserted in the openings 47. Thus, it will be seen that the riser 32 may be securely clamped to the structure 14.

Another type of clamp is shown in FIGS. 7 and 8 in which the horizontal member 16 has attached to it by structural member 50 one portion of clamp 51 which is arranged on members 52; the slidable portion of clamp 53 is also arranged on the members 52 and is movable by sleeve means 54 operated by nuts 55. Thus, the riser 32 is maneuvered within the clamp made up of members 51 and 53 from the water surface 13 while observing and controlling the operations remotely with TV. The nuts 55 are then tightened with wrenches mounted on an atmospheric manipulator or bell or operated by a diver with an impact wrench or remote manipulator. With the movement of clamp 53, the riser 32 is tightly held by the clamp 27. It will, thus, be seen from the foregoing description taken with the drawing that a preferred mode and embodiment have been illustrated which are quite advantageous and useful in that the whole operation is performed by use of flexible members and clamps with flow lines and barges which heretofore were not possible; therefore, the invention is quite important and useful.

The nature and objects of the present invention having been completely described and illustrated and the best mode and embodiment contemplated set forth what I wish to claim as new and useful and secure by Letters Patent is:

1. A method for installing a riser pipe on an offshore structure positioned in a body of water which comprises:

laying a string of pipe having a free end located adjacent said structure on water bottom;

raising the free end of said string of pipe above said water bottom and connecting to said free end a section of pipe;

lowering said string of pipe to water bottom in which position of said string of pipe said section of pipe extends upwardly;

maintaining tension on said string of pipe while said string of pipe is off water bottom, said tension being sufficient to prevent bending stress in said pipeline from exceeding the allowable stress thereof; and connecting said section of pipe to said offshore structure.

2. A method as recited in claim 1 including adding additional sections of pipe to said section of pipe while lowering said string of pipe to water bottom, said sections of pipe extending upwardly to at least adjacent the upper end of said structure when said string of pipe is positioned on water bottom.

3. A method as recited in claim 1 in which said section of pipe is substantially perpendicular to said pipe string and extends substantially vertically when said pipe string is on water bottom.

4. A method as recited in claim 3 in which said free end of said pipe string is initially raised to above the water surface and said section of pipe is connected to said free end of said pipe string above the surface of the water.

5. A method as recited in claim 3 in which said free end of said pipe string is supported by a barge while said section of pipe is being connected thereto.

6. A method for installing a flowline riser on an offshore structure in a body of water which comprises:

laying a pipe string having a free end on water bottom such that the free end is selectively positioned relative said structure;

raising the free end of said pipe string at least adjacent the surface of the water, adjusting the length of said pipe string and connecting to said free end a section of pipe extending approximately perpendicular thereto;

lowering said pipe string to water bottom while connecting links of pipe to said section of pipe until said perpendicular section extends at least adjacent the upper end of said structure;

maintaining tension on said pipe string in a horizontal direction along which said pipeline has been laid on water bottom while said pipe string is off water bottom during raising and lowering of said pipe string, said tension being sufficient to prevent bending stress in said pipeline from exceeding the allowable stress thereof; and then connecting said section of pipe and said links of pipe to said offshore structure.

7. A method in accordance with claim 6 in which:
   a. said pipe string is raised and lowered by a flexible member on said structure;
   b. said pipe string is laid by pulling same to said structure; and
   c. said structure supports a platform above water surface.

8. A method in accordance with claim 6 in which the upper end of said structure is a platform.

9. A method in accordance with claim 6 in which the top of said structure is a submerged platform.

10. A method in accordance with claim 6 in which said pipe string is raised and lowered by a flexible member on said structure.

11. A method in accordance with claim 6 in which said pipe string is laid by pulling the same to said structure.

12. Apparatus for installing a flowline riser on an offshore structure and connecting said flowline riser to a pipeline laid on water bottom which comprises:

a pipeline having a free end on water bottom adjacent and selectively positioned with respect to said structure;

means for moving said pipeline vertically in said water adjacent said structure;

means for applying tension on said pipeline in the direction of installation;

means for connecting a sufficient length of riser pipe to said free end substantially perpendicular to said pipeline to form said riser of a length sufficient to extend from water bottom to at least a point adjacent the upper end of said structure; and means for attaching said riser to said structure.

13. Apparatus in accordance with claim 12 in which said means for moving said pipeline vertically includes at least one hoisting means.

14. Apparatus in accordance with claim 12 in which said structure extends above water surface.

15. Apparatus in accordance with claim 12 in which said means for attaching said riser includes a plurality of vertically spaced apart clamps on said structure.

16. Apparatus as recited in claim 12 in which said connecting means is supported on supporting means separate from said structure.

17. Apparatus in accordance with claim 16 in which said supporting means separate from said structure is at least one vessel.

18. Apparatus in accordance with claim 12 in which said means for applying tension on said pipeline includes at least one vessel.

19. Apparatus in accordance with claim 12 in which said means for applying tension on said pipeline includes a flexible member connected to pulling means and to said pipeline.

20. A method for installing a riser pipe on an offshore structure positioned in a body of water which comprises:
   laying a string of pipe having a free end located adjacent said structure;
   connecting a section of pipe to the free end of said string of pipe above water bottom;
   lowering said string of pipe to water bottom in which position of said string of pipe said section of pipe extends upwardly;
   maintaining tension on said string of pipe while said string of pipe is off water bottom, said tension being sufficient to prevent bending stress in said pipeline from exceeding the allowable stress thereof; and
   connecting said section of pipe to said offshore structure.

21. A method as recited in claim 20 in which said free end of said pipe string is initially on water bottom and is raised to above the water surface and said section of pipe is connected to said free end of said pipe string above the surface of the water.

22. A method as recited in claim 20 in which said free end of said pipe string is initially above the water surface and said section of pipe is connected to said free end of said pipe string above the surface of the water.

* * * * *